(12) United States Patent
Larraza et al.

(10) Patent No.: US 9,705,383 B1
(45) Date of Patent: Jul. 11, 2017

(54) LIGHT ACTIVATED GENERATOR

(71) Applicant: The United States of America, as represented by the Secretary of the Navy, Washington, DC (US)

(72) Inventors: Andres Larraza, Salinas, CA (US); David M. Wolfe, Texarkana, TX (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/130,189

(22) Filed: Apr. 15, 2016

Related U.S. Application Data

(63) Continuation-in-part of application No. 15/093,047, filed on Apr. 7, 2016.

(60) Provisional application No. 62/311,704, filed on Mar. 22, 2016.

(51) Int. Cl.
*H02K 7/18* (2006.01)
*F03G 6/00* (2006.01)

(52) U.S. Cl.
CPC .............. *H02K 7/1823* (2013.01); *F03G 6/00* (2013.01)

(58) Field of Classification Search
CPC ................................ H02K 7/1823; F03G 6/00
USPC .......................................... 356/216; 60/641.8
See application file for complete search history.

(56) References Cited

U.S. PATENT DOCUMENTS

| 182,172 | A | * | 9/1876 | Crookes | G01J 1/04 244/1 R |
|---|---|---|---|---|---|
| 1,000,831 | A | * | 8/1911 | Martin | G01J 1/04 356/216 |
| 4,397,150 | A | * | 8/1983 | Paller | F03G 7/00 356/216 |
| 4,410,805 | A | * | 10/1983 | Berley | H02N 11/002 290/1 R |
| 4,926,037 | A | * | 5/1990 | Martin-Lopez | H02N 11/006 250/205 |
| 5,611,208 | A | | 3/1997 | Hemmerich et al. | |
| 5,871,336 | A | | 2/1999 | Young | |

(Continued)

OTHER PUBLICATIONS

Scandurra et al., "Gas kinetic forces on thin plates in the presence of thermal gradients," Physical Review E 75(2) (2007).

(Continued)

*Primary Examiner* — Viet Nguyen
(74) *Attorney, Agent, or Firm* — Naval Postgraduate School; James B. Potts

(57) ABSTRACT

Provided is a light activated generator comprising typically a plurality of vanes affixed to a hub rotatable around the longitudinal axis of an axle. Each vane comprises a conductor and comprises a planar surface oriented generally perpendicular to the longitudinal axis of the axle with each vane separated into a first surface and a second surface. The first and second surfaces are generally co-planer and perpendicular to the longitudinal axis of the axle. Additionally, the first and second surfaces have differing emissivities. When the light activated generator is illuminated with a radiant flux, the differing emissivities of the first and second surfaces produce a temperature gradient across the vane, and a thermal creep force across the planar surface generates a revolution of the vane around the longitudinal axis of the axle to motivate the conductor through a magnetic field, generating a voltage across the conductor.

18 Claims, 5 Drawing Sheets

(56) References Cited

U.S. PATENT DOCUMENTS

| | | | |
|---|---|---|---|
| 8,235,675 | B2 | 8/2012 | Gianchandani et al. |
| 8,596,572 | B1* | 12/2013 | Kirshman .............. B64C 39/00 244/1 R |
| 9,106,112 | B2* | 8/2015 | Farquharson ........ H02K 7/1807 |
| 2012/0204564 | A1* | 8/2012 | Battaglia .................. F03G 7/00 60/641.8 |
| 2014/0159377 | A1* | 6/2014 | Farquharson ........ H02K 7/1807 290/1 A |
| 2015/0013337 | A1 | 1/2015 | Nutter et al. |

OTHER PUBLICATIONS

Chen et al., "The dynamic mechanism of a moving Crookes radiometer," Phys. Fluids 24 (2012).

Seldon et al., "Experimental and Computational Study of Area and Perimeter Contributions to Radiometer Forces," School of Aeronautics and Astronautics Faculty Publications. Paper 20. http://dx.doi.org/10.1063/1.3076616 (accessed Apr. 1, 2016).

Shida et al., "Maxwell's Thermal Creep in Two Space Dimensions," Journal of the Physical Society of Japan, 67(7) (1998).

Wadsworth et al., "A Computational Study of Radiometric Phenomena for Powering Microactuators with Unlimited Displacements and Large Available Forces," Journal of Microelectromechanical Systems, 5(1) (1996).

Alexeenko et al, "Low Speed Nano/Micro/Meso-Scale Rarefied Flows Driven by Temperature and Pressure Gradients," Rarified Gas Dynamics, pp. 1085-1092 (2007).

Scandurra, "Enhanced Radiometric Forces," http://arXiv:physics/0402011 [physics.class-ph] (accessed Apr. 1, 2016).

Wolfe et al., "A horizontal vane radiometer: Experiment, theory,and simulation," Physics of Fluids 28 (2016).

\* cited by examiner

LIGHT ACTIVATED GENERATOR

RELATION TO OTHER APPLICATIONS

This patent application claims priority from provisional patent application 62/311,704 filed Mar. 22, 2016 and non-provisional patent application Ser. No. 15/093,047 filed Apr. 7, 2016, which are hereby incorporated by reference in their entirety.

FIELD OF THE INVENTION

One or more embodiments relates to a light activated generator for the generation of electrical power using a plurality of vanes having surfaces of differing emissivity in order to generate thermal creep and motivate a conductor through a magnetic field. The higher and lower emissivity surfaces are generally co-planer with each other and co-planer with a plane of rotation.

BACKGROUND

Thermal transpiration or thermal creep refers to the thermal force on a gas due to a temperature difference. Thermal transpiration generates a flow of gas in the absence of pressure differences, and maintains a certain pressure difference in a steady state. In most applications, the effect is strongest when the mean free path of the gas molecules is comparable to the dimensions of a container or device.

A well-known device which relies on thermal transpiration is Crookes' Radiometer, also known as a light mill. Generally the light mill is a small chamber containing typically four or more vanes mounted symmetrically around a vertically-oriented axle, with opposing sides of each vane generally parallel to the axle. The parallel sides of the vanes are configured as a high emissivity surface on one side and a lower emissivity surface on an opposite side. When intense light impinges on the vessel, the temperature of the higher emissivity side becomes greater than the lower emissivity side, and the temperature difference generates a force directed toward the colder surface as air molecules contained in the vessel strike on the vanes. See e.g., Scandurra et al., "Gas kinetic forces on thin plates in the presence of thermal gradients," *Physical Review E* 75(2) (2007), among others. At low pressure the exerted forces are generally proportional to the temperature gradient on the vane, as well as the mean free path of gas molecules, the density of the gas, cross section of the molecules, and other factors. In light mills where the differing emissivity surfaces occupy opposing sides of the vane, a thermal flow of molecules occurs from the cold to the hot side of the vane, and the reaction to this streaming is a force directed opposite to the temperature gradient, in a direction generally normal to the hotter surface, causing the vanes to revolve around the vertically-oriented axle with the low emissivity surface leading and normal to the plane of rotation. This generates corresponding rotation of the axle about its longitudinal axis.

A variety of devices have exploited the resulting rotation of vertical-surface driven light mills for the generation of electrical and mechanical power. Typically electrical generator configurations have utilized the rotating axle as the prime mover to motivate a generator rotor emitting a magnetic field. See, for example, U.S. Pat. No. 4,410,805 issued to Berley, issued Oct. 18, 1983, and see U.S. Pat. No. 4,397,150 issued to Paller, issued Aug. 9, 1983, and see U.S. patent application Ser. No. 14/288,253, filed by Nutter et al. on May 27, 2014 and published as US 2015/0013337 A1 on Jan. 15, 2015. Other devices have directly utilized axle rotation as mechanical power driving, for example, a torque converter. See e.g. U.S. Pat. No. 4,926,037 issued to Martin-Lopez, issued May 15, 1990. Other devices have exploited the resulting rotation of vertical-surface driven light mills for electrical power generation by providing a magnetic field around the light mill and winding an armature to provide conductors oriented generally parallel and perpendicular to a resulting plane of rotation. See e.g., U.S. Pat. No. 9,106, 112 B2 issued to Farquharson et al., issued Aug. 11, 2015. However, all these devices rely on differing emissivity surfaces occupying opposing sides of the vane and result in vertically hung vanes revolving around the vertically-oriented axle with the low emissivity surface leading and normal to the plane of rotation. Due to the reliance on this configuration, the maximum effective length of the rotational force in these devices is on the order of a mean free path length of the surrounding gas, requiring that the opposing high and low emissivity surfaces of these vanes be separated by a thickness substantially equal to this mean free path. As a result, these devices are typically constrained to operate in rarified atmospheres. Further, the vane configurations produce a rotation which constrains the lower emissivity surface to present itself as a significant blunt drag object in the surrounding atmosphere. This tends to impede motion as surrounding pressure is increased and additionally limits the rotational speed which may be achieved, limiting the power generation capabilities of the device.

Thermal transpiration has also been employed to address challenges inherent to miniaturized moving parts, such as micropumps. See e.g. U.S. Pat. No. 5,871,336 issued to Young, issued Feb. 16, 1999, and see U.S. Pat. No. 8,235, 675 issued to Gianchandani et al., issued Aug. 7, 2012, and see U.S. Pat. No. 5,611,208 issued to Hemmerich et al., issued Mar. 18, 1997, among others. In these applications, thermal transpiration is employed in a narrow channel to sustain a non-zero longitudinal pressure gradient when subjected to a temperature bias, where the narrow channel has hydraulic diameter smaller than the mean free path of the gas molecules and the temperature gradient is generally parallel to the confining walls of the channel. One accepted physical mechanism which explains the phenomenon posits that an asymmetric momentum transfer between the gas molecules and the channel walls is primarily responsible, since gas molecules from hot areas have a higher average velocity compared to the molecules from the cold side. In Knudsen-type pumps, this asymmetry results in an effective momentum transfer to the channel walls in the direction opposite to the temperature gradient. Although the wall is stationary, this does generate a force parallel to the channel surface, as opposed to generating forces normal to the surface as occurs in the light mills employing vertically mounted vanes.

It would be advantageous to provide a light activated generator which generates thermal creep and corresponding momentum transfers parallel to a vane surface in order to generate rotary motion in response to a radiant flux such as light and directly motivate a conductor through a magnetic flux for the generation of electrical energy. Such a light activated generator would be free of constraints closely tying vane thickness to mean free path lengths, and further would greatly mitigate the impact of light absorbing surfaces acting as blunt force drag objects tending to impede the generated rotary motion. Additionally, such as device would be more amenable to miniaturization allowing potential operation at normal atmospheric pressures.

These and other objects, aspects, and advantages of the present disclosure will become better understood with reference to the accompanying description and claims.

SUMMARY

The disclosure provides a light activated generator comprising typically a plurality of vanes affixed to a hub rotatable around the longitudinal axis of an axle. Each vane generally comprises a planar surface oriented generally perpendicular to the longitudinal axis of the axle, with the planer surface is divided into a first surface of higher emissivity and a second surface of lower emissivity. When a radiant flux such as light simultaneously impinges the adjacent high emissivity and low emissivity surfaces, the differing emissivities produce a temperature gradient across the vane, generally parallel to the vane surfaces, and generally perpendicular to the longitudinal axis. This generates a thermal creep force across the planar surface of the vane in a direction from the high emissivity surface to the low emissivity surface, and generates a revolution of the vane and the affixed hub around the longitudinal axis of the axle. Additionally, a conductor is coupled to each vane and a field generator is oriented such that the rotary motion of the vanes motivates the conductors through a magnetic field, generating electrical power. The electrical power is harvested via first and second terminals connected across each conductor.

The light activated generator generally comprises an axle having a longitudinal axis and fixably attached to a foundation, a hub surrounding the axle and rotatable about the longitudinal axis, at least one a vane coupled to the hub. The vane comprises a conductor generally extending the length of the vane, such that an end of the conductor generally traces a pitch circle around the axle as rotation occurs. The light activated generator further comprises a field generator oriented o provide magnetic flux typically perpendicular to the direction of conductor travel over at least some portion of the conductor's motion. A perimeter contact is positioned on the pitch circle to establish electrical contact with the conductor as the conductor passes through the magnetic flux. Additionally, a terminal is in electrical contact with the perimeter contact and additional terminal is in electrical contact with an end of the conductor opposite the perimeter contact in order to harvest electrical power generated by the light activated rotor.

A method for a voltage using a radiant flux is additionally disclosed comprising surrounding a vane with a gaseous atmosphere, where the vane is coupled to a hub surrounding and rotatable around an axle having a longitudinal axis, and where the vane comprises a conductor and comprises a first surface and a second surface having characteristics as earlier described. The method further comprises directing the radiant flux toward the first surface and second surface of the vane and generating a first temperature on the first surface and a second temperature on the second surface, generating a thermal creep force from the first surface to the second surface using the temperature gradient and the gaseous atmosphere surrounding the vane, and generating rotary motion of the vane and the hub around the axle using the thermal creep force. The method further comprises providing a magnetic field in a volume surrounding some portion of the rotary motion of the of the vane comprising the conductor and generating a voltage between a first terminal in electrical contact with a first end of the conductor and a second terminal in electrical contact with a second end of the conductor, thereby generating the voltage using the radiant flux.

The novel apparatus and principles of operation are further discussed in the following description.

Embodiments in accordance with the invention are further described herein with reference to the drawings.

DETAILED DESCRIPTION OF THE INVENTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide a light activated generator for the production of a voltage using rotary motion activated by an incident radiant flux.

The disclosure provides a light activated generator comprising one or more vanes affixed to a hub rotatable around the longitudinal axis of an axle, where the vane comprises a conductor extending generally perpendicular to the longitudinal axis of the axle. The vane further comprises a planar surface oriented generally perpendicular to the longitudinal axis of the axle, with the planar surface separated into a first surface and a second surface. The first and second surfaces are generally co-planer and adjacent to a common boundary generally perpendicular to the longitudinal axis of the axle, and the first and second surfaces have differing emissivities. Revolution of the vane and rotation of the affixed hub about the axle generates corresponding revolution of the conductor around the axle, and the light activated generator further comprises a perimeter contact which establishes electrical contact with an end of the conductor during at least some part of its revolution, and comprises a field generator oriented to provide a magnetic field around to the conductor as electrical contact with the perimeter contact occurs. When the vane or vanes are illuminated with a radiant flux such as light, the differing emissivities of the first and second surfaces produce a temperature gradient across the vane and generally perpendicular to the longitudinal axis, and the temperature gradient in concert with an atmosphere around the light activated rotor generate a thermal creep force across the planar surface of the vane in a direction from the first surface to the adjacent second surface. The thermal creep force generates a revolution of the vane and the conductor around the longitudinal axis of the axle, and the motion of the conductor through the magnetic field generates a voltage between a terminal in electrical contact with the perimeter contact and a terminal in electrical contact with the conductor. In certain embodiments, a width W of the vane generally within the plane of rotation of the vane is at least 5 times greater than a height of the vane normal to the plane of rotation, in order to mitigate blunt drag forces as revolution occurs. In other embodiments, the width W is less than about 100 µm and the light activated rotor is surrounded by air at a pressure of at least 80 kPa.

Figure 1:
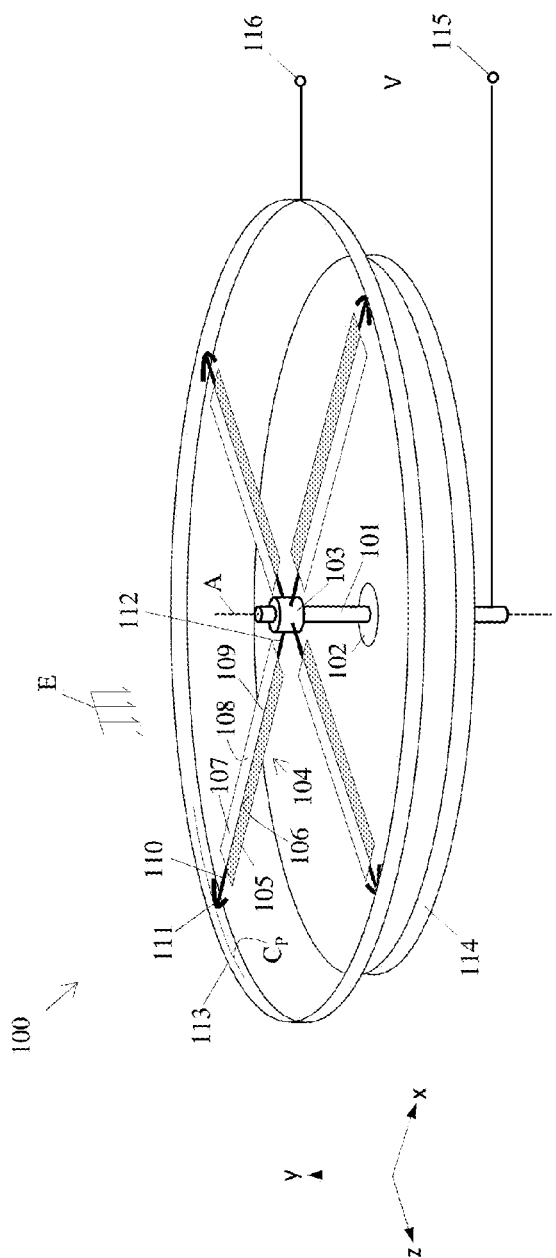
FIG. 1 illustrates an embodiment of a light activated generator.

FIG. 1 illustrates an embodiment of a light activated generator generally indicated at 100. Light activated generator 100 comprises an axle 101 having a longitudinal axis A and typically fixably attached to foundation 102, and further comprises a hub 103 surrounding axle 102 and rotatable about longitudinal axis A. Light activated generator 100 additionally comprises a vane generally indicated 104 which is coupled to hub 103. Typically light activated generator 100 comprises a plurality of vanes, as illustrated, and vane 104 is coupled to hub 103 in a manner such that a revolution of vane 104 around longitudinal axis A generates corresponding rotation of hub 103 around longitudinal axis A. For example, vane 104 may be fixably attached to hub 103.

Vane 104 comprises a first section 105 comprising first surface 106 and a second section 107 comprising second surface 108. Additionally, first surface 106 and second surface 108 border a common boundary 109 and are typically adjacent. Typically some portion of common boundary 109 is coplanar with the longitudinal axis A of axle 101, and first surface 106 and second surface 108 are coplanar over the portion of common boundary 109 coplanar with longitudinal axis A. Typically, vane 104, first surface 106, second surface 108, and common boundary 109 are substantially perpendicular to longitudinal axis B as illustrated at FIG. 1, where longitudinal axis B is parallel to the y axis and the reference plane P is parallel to the x-z plane of the axes shown. In an embodiment and in accordance with the axes shown, first section 105 and second section 107 are oriented such that a normal vector n to an x-z plane has an acute angle with longitudinal axis A of less than 45 degrees, when the x-z plane is parallel to first surface 106 and second surface 108 over the portion of common boundary 109. In an embodiment, the acute angle is less than 30 degrees, and in another embodiment less than 15 degrees. In further embodiment, at least 75%, 85%, or 95% of common boundary 109 separating first surface 106 and second surface 108 is coplanar with the longitudinal axis A of axle 101. In another embodiment, at least 75%, 85%, or 95% of first surface 106 and at least 75%, 85%, or 95% of second surface 108 is substantially parallel to the x-z plane.

Additionally, at FIG. 1, first surfaces 106 and second surface 108 are surfaces of differing emissivity, with first surface 106 having a greater emissivity than second surface 108. As a result, if surfaces 106 and 108 are in thermal equilibrium with each other and a surrounding environment, and are then exposed to a radiant flux such as light E, the apparent temperature of the environment increases and first surface 106 and second surface 108 increase in temperature until they are again at equilibrium with the environment and each other, but the first surface 106, with greater emissivity, will initially increase in temperature more quickly. As a function of time then, the temperature difference between first surface 106 and second surface 108 will be substantially zero before being exposed to light E and increase to a maximum as first surface 106 heats up more quickly. Here, "radiant flux" means electromagnetic radiation emitted, reflected, transmitted or received, per unit time. The temperature difference when exposed to a radiant flux such as light E provokes thermal creep force acting from first surface 106 to second surface 108, and generate a rotation ω of vane 104 and hub 103 around axle 101. See Wolfe et al., "A Horizontal Vane Radiometer: Experiment, Theory, and Simulation," *Phys. Fluids* 28, (2016); see also U.S. patent application Ser. No. 15/093,047 filed by Larraza et al., filed Apr. 7, 2016. In a particular embodiment, first surface 106 has a first emissivity $\epsilon_H$ and second surface 108 has a second emissivity $\epsilon_C$, and $(\epsilon_H-\epsilon_C) \geq 0.1$. Further, common boundary 109 allows close enough proximity between first surface 106 and second surface 108 to create a continuous temperature gradient in a surrounding gas. In an embodiment, the proximity is no greater than 10 mean free paths of a surrounding atmosphere between the two surfaces, in another embodiment no greater than 5 mean free paths, and in still another embodiment no greater than 1 mean free path. The common boundary may be a common border between the first and second surfaces, may comprise an intervening material between the first and second surfaces, or may comprise a physical gap between the first and second surfaces. In another embodiment, first surface 106 has a first width perpendicular to the longitudinal axis B, second surface 108 has a second width perpendicular to longitudinal axis B, and common boundary 109 has a boundary width perpendicular to longitudinal axis B, where the boundary width may be zero, and a total width equal to the first width added to the second width added to the boundary width is greater than 3 mean free paths of an atmosphere surrounding the vane, in another embodiment greater then 5 mean free paths, in another environment greater than 10 mean free paths, and in another environment greater than 20 mean free paths.

Vane 104 further comprises a conductor 110 having first end 111 and second end 112. Conductor 110 is typically a linear member extending the length of vane 104. Further, when vane 104 and hub 103 rotate about axle 101, second end 112 of conductor 110 traces a pitch circle around axle 101, such as the portion of pitch circle $C_P$ at FIG. 1. For example, when light activated generator 100 is illuminated by radiant flux E and thermal creep from first surface 106 to second surface 108 generates the rotation ω of hub 103, second end 112 of conductor 110 traces a pitch circle comprising $C_P$. Conductor 110 may comprise any material which allows the flow of electrical current between first end 111 and second end 112.

Light activated generator 100 further comprises perimeter contact 113. Perimeter contact 113 is positioned on the pitch circle traced by second end 112 and establishes electrical contact with second end 112 of conductor 110 over at least a portion of the pitch circle when hub 103 rotates on the axle. Here, "electrical contact" means that a first component and a second component establish a physical proximity such that an electrical current may flow between the first component and the second component, where the current may flow directly between the first component and the second component, or may additionally flow through intervening components in a current path between the first component and the second component. Additionally, perimeter contact 113 may extend throughout the pitch circle of second end 112 as is illustrated at FIG. 1, or just extend over portion of or substantially at a point on the pitch circle.

Light activated generator 100 additionally comprises field generator 114. Field generator 114 is positioned to provide a magnetic flux through a spatial volume intersected by conductor 110 when perimeter contact 113 is in electrical contact with second end 112 of conductor 110. Field generator 114 is typically oriented to provide a magnetic flux having lines of flux generally perpendicular to the path of conductor 110 as conductor 110 sweeps through the magnetic flux. Field generator 114 may be any device which can be oriented to provide the magnetic flux as described such as a permanent magnet, electromagnet, solenoid or other magnetic core device. See e.g., Edward P. Furlani, *Permanent Magnet and Electromechanical Devices: Materials, Analysis, and Applications* (2001), among others. In an embodiment, field generator 114 is oriented to provide magnetic flux generally parallel to longitudinal axis A. In another embodiment, field generator 114 provides flux generally perpendicular to the pitch circle generated by second end 112 of conductor 110. In a further embodiment, the field generator is configured to produce a magnetic field having a magnetic moment pointing from the south pole of the magnetic field to the north pole of the magnetic field, and the field generator is positioned such that the magnetic moment is substantially perpendicular to the pitch circle generated by second end 112 of conductor 110 when hub 103 rotates around longitudinal axis A. In another embodiment, the field generator is positioned such that the magnetic moment is parallel to longitudinal axis A. In a further embodiment, the field generator is a permanent magnet having a magnetic moment pointing from the south pole of the permanent magnet to the north pole of the permanent magnet, and the magnetic moment is substantially perpendicular to the pitch circle generated by second end 112 of conductor 110 when hub 103 rotates around longitudinal axis A, and in another embodiment, the magnetic moment of the permanent magnet is parallel to longitudinal axis A.

In an embodiment, perimeter contact 113 is coupled to foundation 102 or field generator 114 either directly or via intervening objects. In another embodiment, field generator 114 is coupled to foundation 102. Here, when a first and second object are "coupled," this means that the first and second object are in direct physical contact or that the first object is in direct physical contact with an intervening object or group of objects which is direct physical contact with the second object, where the direct physical contact may be permanent or impermanent, continuous or intermittent, and where the first and second objects may act as a single rigid body when coupled or may retain some capacity for independent movement when coupled.

Light activated generator 100 further comprises a first terminal 115 in electrical contact with first end 111 of conductor 110 and a second terminal 116 in electrical contact with perimeter contact 113. As before, the respective terminals may establish electrical contact through direct contact with first end 111 or perimeter contact 113, or may establish contact as part of a current path which passes through intervening objects. For example, at FIG. 1, where hub 103 is in electrical contact with conductor 110 and axle 101, terminal 115 is in electrical contact with first end 111 via a current path from first end 111, to hub 103, to axle 101, and to terminal 115. It is understood that the current path of FIG. 1 is exemplary only and any intervening objects may be present provided electrical contact is established between first terminal 115 and first end 111, and between second terminal 116 and perimeter contact 113.

Light activated generator 100 thereby provides a generator using a horizontal vane radiometric rotor to generate thermal creep and vane revolution about an axle as a result of interaction with a radiant flux and a surrounding environment, where the vanes comprise first and second surfaces of differing emissivity and are generally co-planer over some portion of a common boundary. The vane revolution generates motion of an affixed conductor through a magnetic field, generating a voltage and current flow through the conductor. During the revolution, the conductor either periodically or continuously establishes electrical communication with a perimeter contact. The voltage may be harvested using a first terminal in electrical communication with the first end of the conductor and a second terminal in electrical communication with the perimeter contact.

Typically the total width of vane 104 (where width is along the z-axis of FIG. 1) is significantly greater than the height of vane 104 (where height is along the y-axis of FIG. 1), and correspondingly the thermal creep forces provoked by light activated generator 100 are generated substantially wholly within a plane of rotation parallel to the x-z plane, based on the orientation of first surface 106 and second surface 108 relative to axle 101. In a particular embodiment, the width of vane 104 is at least 5 times greater than the height of vane 104. In another embodiment, the width is at least 10 times greater. In typical embodiments, the height is less than the width. Light activated generator 100 thereby exploits the temperature gradient which arises across the adjacent first surface 106 and second surface 108 through differing emissivity when illuminated by light E in order to provide a thermal creep force and conductor motion generally parallel to the adjacent surfaces, and provides for revolution of vane 108 around axle 101 in a plane of rotation parallel to the coplanar surfaces 106 and 108. See Wolfe, et al., *Phys. Fluids* 28, (2016). The adjacent arrangement of first surface 106 and second surface 108 and the substantially perpendicular orientations with respect to longitudinal axle B largely remove the strict requirement limiting generated thermal creep to surrounding pressures in which mean free path lengths are large with respect to the geometrical dimensions of an apparatus, as opposed to radiometric generating devices which rely on differing emissivity surfaces facing toward opposite directions and generating thermal creep forces normal to the surfaces. See, for example, U.S. Pat. No. 4,410,805 to Berley, U.S. Pat. No. 4,397,150 to Paller, U.S. Pat. No. 4,926,037 to Martin-Lopez, U.S. Pat. No. 9,106,112 to Farquharson et al., and US 2006/0001569 by Scandurra, among others. In a particular embodiment where the light activated rotor is surrounded by an atmosphere, the total width of vane 104 is greater than three times the mean free path of the atmosphere. Mean free paths of a surrounding atmosphere may be determined using methods known in the art. See P. P. J. M. Schram, *Kinetic Theory of Gases and Plasmas* (1991), among others.

Additionally, providing a generator rotor where the width of the vane may be significantly less than the height of the vane assists in mitigating blunt drag forces as revolution occurs. This is in contrast to generating apparatus where the responsible surfaces relied upon for production of thermal creep force are essentially normal to a direction of intended rotation, and the light absorbing surfaces present themselves as significant blunt drag objects in the surrounding atmosphere. This blunt drag tends to impede motion as surrounding pressure, rotational velocity, or both are increased, and can significantly mitigate any increases in resulting revolution rate that might be pursued through increasing the areas of the responsible surfaces. When the desired output of an apparatus is a generated voltage, mitigation of the resulting revolution rate due to relying on surfaces normal to the rotation directly impacts the voltage produced by a conductor when motivated by a given surface area receiving a radiant flux.

Within this disclosure, when a first and second line is "parallel" or "substantially parallel," this means that a first direction vector is parallel to the first line and a second direction vector is parallel to the second line, and the angle between the first direction vector and the second direction vector is less than 15 degrees, preferably less than 10 degrees, more preferably less than 5 degrees, and more preferably less than 1 degree. Similarly, when a first line is "perpendicular" or "substantially perpendicular" to a second line or a geometric plane, this means that a first direction vector is parallel to the first line and a second direction vector is parallel to the second line or parallel to a line within the geometric plane, and the angle between the first direction vector and the second direction vector is at least 75 degrees, preferably at least 80 degrees, more preferably at least 85 degrees, and more preferably at least 1 degree. Similarly, when a first surface or plane and a second surface or plane are "co-planer" or "substantially co-planer" over some displacement X such as a portion of the common boundary, this means that over the distance X, the first line and the second line are in-plane with the reference plane to within 0.3 X, more preferably to within 0.15 X and more preferably with 0.05 X. Further, when a surface is "parallel" or "substantially parallel" to a reference plane, this means a reference line intersects both the surface and the reference plane, and the reference line is substantially perpendicular to the surface and the reference plane.

Additionally, as discussed, common boundary 109 provides sufficient proximity between the first surface 106 and second surface 108 to create a continuous temperature gradient in a surrounding gas. In a particular embodiment, common boundary 109 has a width dimension $W_B$ perpendicular to longitudinal axis A, and $W_B$ is less than or equal to 10 mean free paths of a surrounding atmosphere. In another embodiment, width dimension $W_B$ of common boundary 109 is less than or equal to 5 mean free paths, and in another embodiment, less than or equal to 1 mean free path. The common boundary may be a common border between the first and second surfaces, may comprise an intervening material between the first and second surfaces, or may comprise a physical gap between the first and second surfaces such as an air gap. In the configurations provided in this disclosure, the thermal creep force is a function of the thermal creep shear pressure and the area over which that pressure acts, and the thermal creep shear pressure is a function of the temperature difference between the two surfaces. Correspondingly, in some embodiments common boundary 109 comprises an insulating material to mitigate temperature equalization between the first and second sections while still providing for thermal creep force from the first surface to the second surface. When common boundary 109 comprises some insulating material, it may be advantageous to provide a $W_B$ of about 10 mean free paths to allow thermal creep forces to act on the insulator surface while also providing for increased insulation by the insulator. With a solid insulator, increasing the width typically increases the temperature difference and therefore the thermal creep shear pressure without decreasing the area over which the pressure can act. In contrast, with an air gap, increasing the gap decreases the area over which the thermal creep shear pressure can act. In such cases, it may be advantageous to provide a $W_B$ of about 1 mean free path. In a particular embodiment where the light activated generator is surrounded by an atmosphere having a mean free path λ, a total width W of a vane is equal to a first section width added to a second section width, where the first section width and the second section width are first and second surface dimensions perpendicular to the portion of the common boundary, and $W \leq 100\lambda$ and $W_B \leq 10\lambda$. In another embodiment, $W_B \leq W/5$, in another embodiment $W_B \leq W/10$, in another embodiment $W_B \leq W/50$, and in another embodiment $W_B \leq W/100$.

Figure 2A:
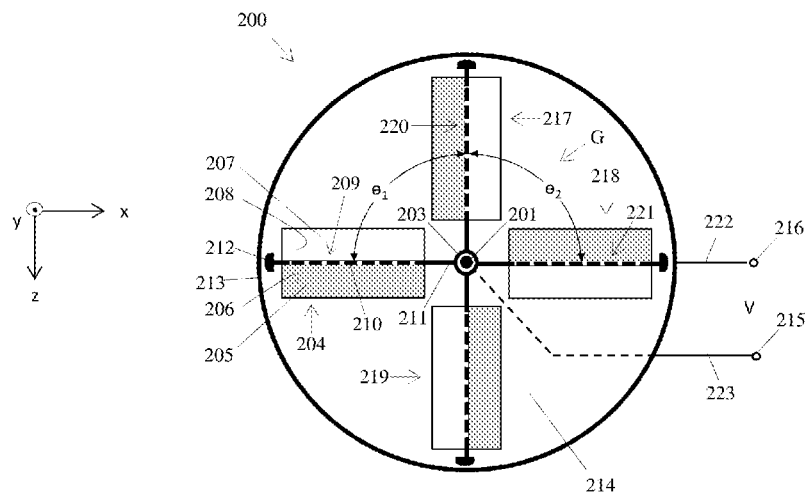
FIG. 2A illustrates a first view of an embodiment of a light activated generator.
Figure 2B:
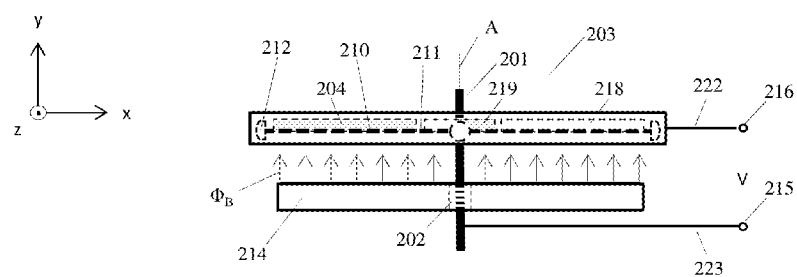
FIG. 2B illustrates a second view of the embodiment of the light activated generator.

FIG. 2A and FIG. 2B illustrate another embodiment, where light activated generator 200 comprises a plurality of vanes 204, 217, 218, and 219 coupled to hub 203. Hub 203 surrounds axle 201 with axle 201 fixably attached to a foundation 202. Vanes 217, 218, and 219 each comprise a first section, first surface, second section, and second surface similar to vane 204, where first section 205 comprises first surface 206 and a second section 207 comprises second surface 208, and first surface 206 and second surface 208 are adjacent to a common boundary generally indicated at 209. Vane 204 is coupled to hub 203 such that vane 204 is substantially perpendicular to a longitudinal axis A generally parallel to the y axis illustrated. At least some portion of common boundary 209 is coplanar with longitudinal axis A, and first surface 206 and second surface 208 are coplanar over the portion of common boundary 209 coplanar with longitudinal axis A. At FIG. 2A, each vane in the plurality of vanes is separated from every other vane by a gap G, such that a first surface of a first vane and a second surface of a second vane are not in contact over a distance of at least 75%, 85%, or 95% of the common boundary of either vane. In another embodiment, the plurality of vanes is arranged symmetrically, such that the common boundary of a given vane is separated from the common boundary of an adjacent vane by an angle θ, and each angle θ in the plurality is within 20 degrees of every other angle θ in the plurality. For example, at FIG. 2A, where angle $\theta_1$ extends between common boundary 209 of vane 204 and common boundary 220 of vane 217, and angle $\theta_2$ extends between common boundary 220 of vane 217 and common boundary 221 of vane 218, angle $\theta_1$ is within twenty degrees of angle $\theta_2$.

Vanes 217, 218, and 219 each comprise a conductor similar to vane 204, where vane 204 comprises conductor 210 having first end 211 and second end 212. Conductor 210 is a linear member extending the length of vane 204, and is illustrated for this embodiment with spatial relationship to vane 204 indicated by dashed lines where appropriate. Second end 212 of conductor 210 traces a pitch circle around axle 201 where the pitch circle provides sufficient proximity for second end 212 to establish electrical contact with perimeter contact 213. Additionally, first end 211 is in electrical contact with hub 203, hub 203 is in electrical contact with axle 201, axle 201 is in electrical contact with lead 223, and lead 223 is in electrical contact with first terminal 215. Light activated generator 200 additionally comprises permanent magnet 214, positioned to provide magnetic flux $\Phi_B$ generally perpendicular to conductor 210 as second end 212 establishes electrical contact with perimeter contact 213.

The light activated generator disclosed may be constructed at any scale which allows thermal creep forces to generate revolution of one or more vanes and the generation of voltage as described. In a particular environment, the light activated is a microelectromechanical system (MEMS) device. In some embodiments, the light activated rotor has characteristic dimensions such as length, width, and height less than about 100 μm. The light activated rotor as described may be fabricated using any combination of means known in the art, including techniques generally known as bulk micromachining, surface micromachining, molding, casting, lithography, etching, chemical vapor deposition (CVD), physical vapor deposition (PVD), electrodeposition, and other applicable techniques. See e.g. N. P. Mahalik, *Microelectromechanical Systems* (2008), among others. Additionally, it is understood that additional materials may be present for the mitigation of adhesion and frictional forces between components such as hub 203 and axle 201, second end 212 and perimeter contact 213, and others, and methodologies such as gas-bearings, air-bearings, liquid-bearings, and others may be employed. See e.g. *Multi-Wafer Rotating MEMS Machines: Turbines, Generators, and Engines* (Jeffrey H. Lang ed., 2009), and see Teo et al., "High-Speed Operation of a Gas-Bearing Supported MEMS-Air Turbine," *Journal of Tribology* 131 (2009), and see Chan et al., "Design and characterization of MEMS micromotor on low friction liquid bearing," *Sensors and Actuators A* 177 (2012), among others.

Figure 3:
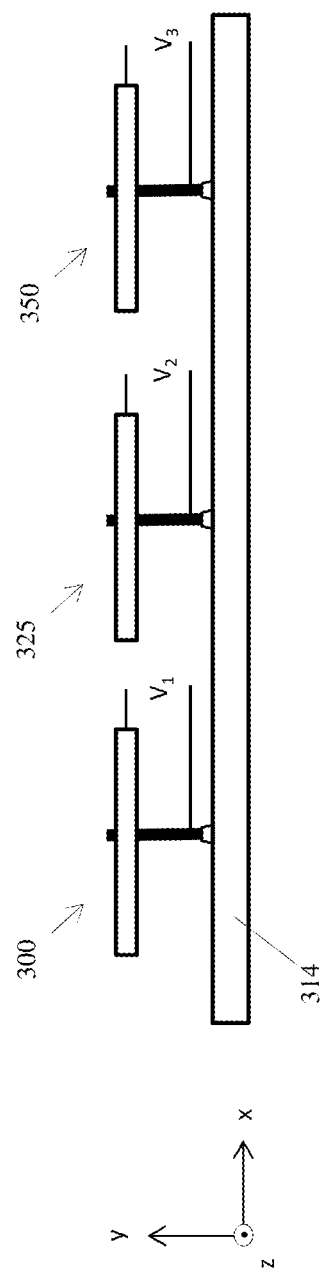
FIG. 3 illustrates a plurality of light activated generators.

Additionally, permanent magnet 214 may be a single, contiguous magnet, may be a plurality of magnets assembled in some arrangement such as a Halbach array, may be a magnetic film, or may be any material sufficient to serve as a field generator as disclosed. See N. M. Dempsey et al., *Nanoscale Magnetic Materials and Applications* (2009), and see Niarchos, "Magnetic MEMS: key issues and some applications," *Sensors and Actuators A* 109 (2003), and see Arnold et al., "Permanent Magnets for MEMS," *Journal of Microelectromechanical Systems* 18 (2009), among others. Further, a single field generating device may serve a plurality of light activated generators, provided the field generating device is positioned to provide a magnetic flux through a spatial volume intersected by each conductor when in electrical contact with a perimeter contact. For example, FIG. 3 illustrates a plurality of light activated generators comprising 300, 325, and 350 where each light activated generator comprises vanes (not shown) with planes of rotation parallel to the x-z plane of the axes illustrated. The plurality of light activated generators 300, 325, and 350 generate voltages $V_1$, $V_2$, and $V_3$ respectively as a single field generating device 314 provides magnetic flux perpendicular to each conductor (not shown) in the plurality of light activated rotors.

In a particular embodiment, the light activated generator further comprises an atmosphere surrounding a vane and a radiant flux impinging the first surface and the second surface of the vane, with the radiant flux generating a first temperature on the first surface and a second temperature less than the first temperature on the second surface. The first and second temperatures produce a temperature gradient and thermal creep force in a direction from the first surface to the second surface, and the thermal creep force generates a revolution of the vane and the conductor around the longitudinal axis of the axle and a revolution of the second end of the conductor tracing the pitch circle around the axle when the hub rotates on the axle. This embodiment further comprises the magnetic flux provided by the field generator, and the magnetic flux and conductor generating a voltage between the first terminal and the second terminal when the perimeter contact is in electrical contact with the second end of the conductor. In certain embodiments, the atmosphere surrounding the vane comprises air at a pressure of at least 80 kPa, and a total width W of the vane is less than 100 microns.

Figure 4A:
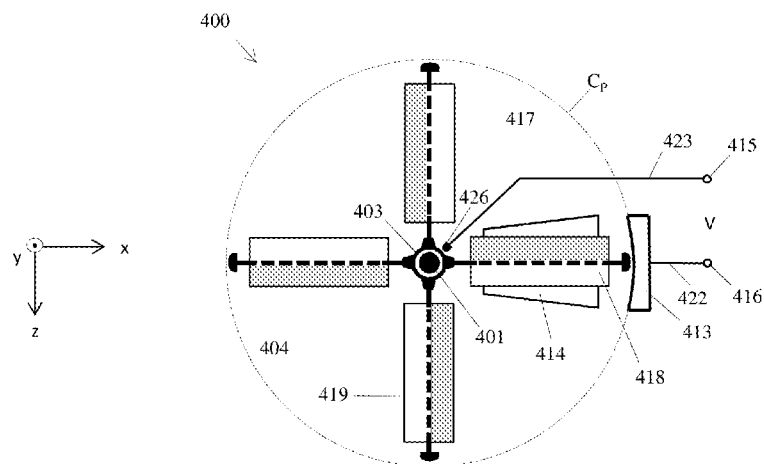
FIG. 4A illustrates a first view of an additional embodiment of a light activated generator.
Figure 4B:
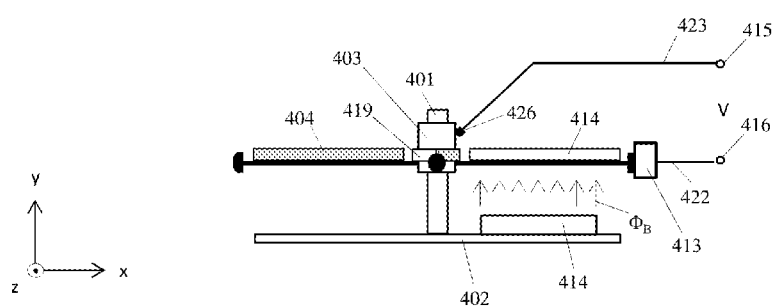
FIG. 4B illustrates a second view of the additional embodiment of the light activated generator.

A further embodiment of a light activated rotor is illustrated at FIG. 4A and FIG. 4B and generally indicated at 400. Light activated rotor 400 a plurality of vanes 404, 417, 418, and 419 where each vane comprises a first surface and second surface as previously described. Hub 403 surrounds axle 401 with axle 401 fixably attached to a foundation 402. Vanes 404, 417, 418, and 419 are fixably attached to hub 403 and revolve around axle 401 with corresponding rotation of hub 403 around axle 401 as earlier described. Additionally, the conductor of each vane is in electrical contact with hub 403 as the vanes revolve and hub 403 rotates, and stationary contact 426 is in slidable and electrical contact with hub 403. Each vane additionally comprises a second end of a conductor (not shown) which traces the pitch circle $C_P$ as the plurality of vanes revolves around axle 401. As illustrated, light activated generator further comprises perimeter contact 413 around some portion of pitch circle $C_P$, and comprises field generator 414 oriented to provide a magnetic flux $\Phi_B$ through a volume traversed by a conductor as a vane approaches and the conductor makes electrical contact with perimeter contact 414. Additionally, second terminal 416 is in electrical contact with perimeter contact 413 via lead 422, and first terminal 415 is in electrical contact with the first end of the conductor passing through the magnetic flux via lead 423, stationary contact 426, and hub 403. Light activated rotor 400 generates voltage V between first terminal 416 and second terminal 423 as thermal creep forces generate revolution of vanes 404, 417, 418, and 419 round axle 401 with corresponding rotation of hub 403 around axle 401.

Figure 5A:
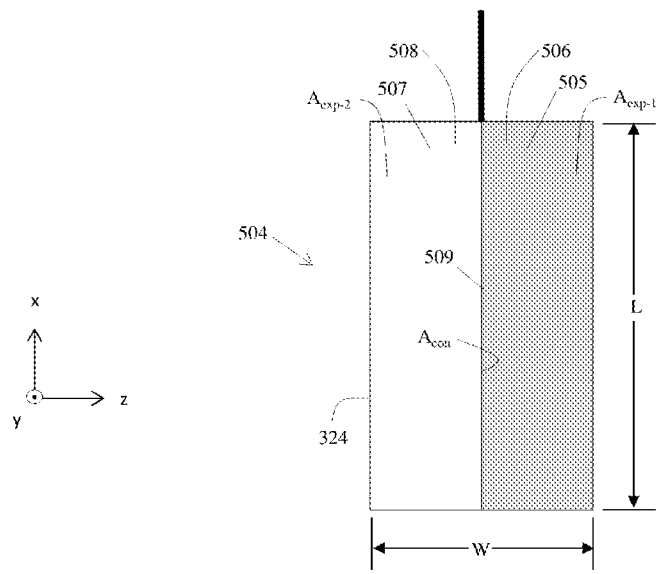
FIG. 5A illustrates a first view of a further embodiment of a horizontal vane utilized by the light activated generator.
Figure 5B:
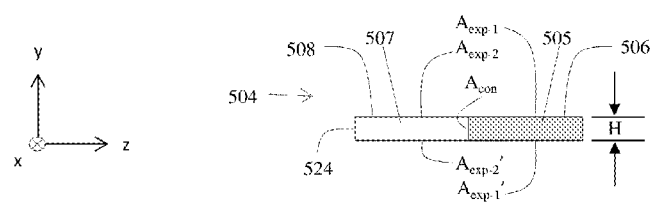
FIG. 5B illustrates a second view of the further embodiment of a horizontal vane utilized by the light activated generator.

An embodiment of a particular vane is further illustrated as vane 504 at FIG. 5A and FIG. 5B, with orientation in accordance with the axes shown. Vane 504 comprises first section 505 comprising first surface 506 and a second section 507 comprising second surface 508, where first surface 506 and second surface 508 have a common boundary 509. As before, vane 504 is coupled to a hub (not shown) surrounding an axle (not shown), and substantially perpendicular to a longitudinal axis generally parallel to the y axis illustrated. At least some portion of common boundary 509 is coplanar with the longitudinal axis, and first surface 506 and second surface 508 are coplanar over the portion of common boundary 509 coplanar with the longitudinal axis. Additionally at FIG. 5A and FIG. 5B, vane 504 has dimensions comprising a width W, height H, and length L. For illustration, the width W is parallel to the z-axis, the height H is parallel to the y-axis, and the length L is parallel to the x-axis. Further, first section 505 and second section 507 are generally in thermal conductive communication over an area $A_{con}$, where common boundary 509 comprises at least some portion of the area $A_{con}$. Here, "thermal conductive communication" means that first section 505 and second section 507 are in sufficient proximity such that conductive heat transfer may occur between first section 505 and second section 507 through the area $A_{con}$. In an embodiment, when first section 505 comprises a surface having a first temperature and second section 507 comprises a surface having a second temperature less than the first temperature, and first section 505 and second section 507 are in thermal conductive communication, conductive heat flow occurs from first section 505 to second section 507 through the area $A_{con}$ and through a portion of common boundary 509 comprising the area $A_{con}$. Additionally, an area $A_{exp-1}$ is equal to the surface area of first section 505 exposed to radiant flux and an area $A_{exp-2}$ is equal to the surface area of second section 507 exposed to radiant flux. Generally at FIG. 3, $A_{con}$ has dimensions of W by H and $A_{exp-1}$ and $A_{exp-2}$ have dimensions of L by W/2, and $A_{exp-1}$ and $A_{exp-2}$ have areas substantially equivalent to first surface 506 and second surface 508 respectively. In a particular embodiment, first surface 506 and second surface 508 have dimensions such that a ratio $R_{AREA}$ is equal to the area of first surface 506 divided by the area of second surface 508, and $0.5 \leq R_{AREA} \leq 1.5$, preferably $0.7 \leq R_{AREA} \leq 1.3$, and more preferably $0.9 \leq R_{AREA} \leq 1.1$. At FIG. 3B, if vane 504 is illuminated by a radiant flux additionally impinging the opposing sides of vane 504, $A_{exp-1}$ and $A_{exp-2}$ further comprise areas $A_{exp-1'}$ and $A_{exp-2'}$ respectively.

As discussed, a particular advantage of the light activated generator disclosed is the enablement of thermally driven rotation around an axle using a first and second surfaces generally perpendicular to a longitudinal axis of the axle, so that the first and second surfaces receiving radiant flux can be largely confined to revolve around the longitudinal axis in a plane of rotation substantially perpendicular to the longitudinal axis. This allows the areas of a given vane intended to receive radiant flux to be largely a function of a length L and a width W, which are also generally confined to the plane of rotation. As discussed, the allows the height H of the vane defining surfaces generally normal to the direction of rotation to be significantly less than either L or W, so that drag forces acting on a surface such as 324 and substantially perpendicular to a rotation ω at FIG. 1 may be mitigated. Toward this end and in particular embodiment, the height H of vane 504 is less than 5 times the width W of vane 304, and in another embodiment the height H is less than 10 times the width W and the drag on vane 504 as vane 504 revolves around the axle substantially comprises thin, flat plate drag. Here, "plane of rotation" means a surface of revolution described by the portion of the common boundary between the first and second surface as the vane and hub revolve around the longitudinal axis of the axle.

When activated by a radiant flux such as light, vane 504 generates a thermal creep force by virtue of a temperature gradient across first surface 506 and second surface 508, and based on an atmosphere surrounding the vane. When the mean free path is larger than the typical length of the temperature gradient, the tangential stress on a surface in the yz plane due to a temperature gradient along the y-direction can be calculated to be:

$$p_{shear} = \frac{15 k_B \alpha}{64\sqrt{2}\, \sigma_{CS}} \frac{dT}{dy}, \tag{1}$$

with $k_B$ Boltzmann's constant, α the accommodation coefficient of the plate, $\sigma_{cs} = \pi d^2$ the hard-sphere collision cross section of molecules with diameter d, and dT/dy the temperature gradient. See Scandurra et al., (2007). If all collisions are assumed to be either perfectly specular or perfectly diffuse, the accommodation coefficient is the fraction of diffuse collisions in a sample. The value of the accommodation coefficient thus ranges between zero and one. The thermal creep force, $F_{TC}$, is this pressure multiplied by the area over which it acts. Taking into account slip length corrections, this force is:

$$F_{TC} = \frac{15}{64\sqrt{2}} \frac{k_B}{\sigma_{CS}} \Delta T \alpha L' \min\left(\frac{W_V}{W_{Ggas}}, 1\right), \tag{1}$$

where $W_V$ is the width of the vane, $$W_{Ggas} = W_{Gsurf} + 2\lambda \frac{2-\alpha}{\alpha}, \tag{2}$$

is the width of the temperature gradient in the gas, with $W_{Gsurf}$ the width of the temperature gradient on the surface of the vane, and $$L' = L - \frac{1}{2}\lambda \frac{2-\alpha}{\alpha}, \tag{3}$$

the correction to the vane's length L perpendicular to the temperature gradient.

The temperature difference (ΔT) on vane 504 is a function of the thermal energy of first section 505 and second section 507. If $T_H$ is the temperature of a hot side for example first section 505, $T_C$ is the temperature of a cold side for example second section 507, C is a heat capacity substantially equivalent in both sections, $U_H$ is the thermal energy of the hot side, and $U_C$ is the thermal energy of the cold side, then $$\Delta T = T_H - T_C = \frac{1}{C}(U_H - U_C) \tag{5}$$

The temperature difference is a maximum when the time rates of change of the thermal energies of the two halves are equal.

$$\frac{\partial (\Delta T)}{\partial t} = 0 \rightarrow \frac{\partial U_H}{\partial t} = \frac{\partial U_c}{\partial t} \tag{6}$$

Generally for at least centimeter sizes dimensions of W, H, and L, the temperature difference on the vanes is not expected to vary with the pressure of a surrounding atmosphere, suggesting convective heat transfer between first section 505 and second section 507 is relatively negligible. The time rates of change of the thermal energies are thus functions of their respective net black body radiation and the thermal conduction rate between them, or $$\frac{\partial U_H}{\partial t} = \sigma_{SB} \varepsilon_H A_{exp}(T_{env}^4 - T_H^4) - k_t A_{con} \frac{\Delta T}{W_G}, \tag{7}$$

and $$\frac{\partial U_C}{\partial t} = \sigma_{SB} \varepsilon_C A_{exp}(T_{env}^4 - T_C^4) + k_t A_{con} \frac{\Delta T}{W_G}, \tag{8}$$

where $\sigma_{SB}$ is the Stephan-Boltzmann constant, ε is the emissivity, $A_{exp}$ is the surface area $A_{exp-1}$ or $A_{exp-2}$ when first surface 506 and second surface 508 are substantially equivalent, $T_{env}$ is the apparent temperature of a surrounding environment, $k^t$ is a thermal conductivity between first section 505 and second section 507 through the area $A_{con}$, and $W_G$ is the width of a temperature gradient in the vane.

The temperature of the hot side of the vane can be rewritten as a function of the temperature of the cold side and the temperature difference.

$$T_H = T_C + \Delta T = T_C\left(1 + \frac{\Delta T}{T_C}\right). \tag{9}$$

Typically the temperature difference is much smaller than the temperature of the cold side of the vane allowing the approximation $$T_H^4 = T_C^4\left(1 + \frac{\Delta T}{T_C}\right)^4 \approx T_C^4 + 4 T_C^3 \Delta T \tag{10}$$

Substituting approximation (10) into equation (7) then setting equal to equation (8) and solving for the temperature difference provides an expression for the maximum temperature difference, $$\Delta T_{max} \approx \frac{\sigma_{SB}(\varepsilon_H - \varepsilon_C)A_{exp}(T_{env}^4 - T_C^4)}{4\sigma_{SB}\varepsilon_H A_{exp}T_C^3 + \frac{2k_t A_{con}}{W_G}} \quad (11)$$

The scaling behavior of this relation depends on which is the dominant term in the denominator. For the centimeter size vanes, the blackbody term is more than 10 times greater than the thermal conductivity term due to the relatively large area exposed and characteristic length of the temperature gradient, and relatively small thermal conductivity and contact area between the two halves. Thus, for centimeter-scale vanes with low thermal conductivity, $$\Delta T_{max} \approx \frac{(\varepsilon_H - \varepsilon_C)(T_{env}^4 - T_C^4)}{4\varepsilon_H T_C^3} \quad (12)$$

This expression also reflects that the magnitude of the temperature difference is not generally a function of the width of the vanes.

The blackbody term is a function of two linear dimensions ($A_{exp}$, or generally L times W) while the thermal conductivity term is a function of one linear dimension and an aspect ratio ($A_{con}/W_G$ or L times H divided by W). For micron-scale vanes then the thermal conductivity term is likely to dominate the denominator. The smaller dimensions will also result in the characteristic length of the temperature gradient being equal to the width of the vane. Assuming the top and bottom of the vane are both exposed to the light source, the maximum temperature difference on a MEMS vane becomes, $$\Delta T_{max} \approx \frac{\sigma_{SB}(\varepsilon_H - \varepsilon_C)W^2(T_{env}^4 - T_C^4)}{2k_t H}, \quad (13)$$

or $$\frac{\Delta T_{max}}{W} \propto \frac{W}{H}, \quad (14)$$

where W is the width of the vane and H is the height or thickness of the vane. The temperature gradient is thus a function of the aspect ratio of the width (which affects the net blackbody radiation) to the thickness (which affects the thermal conductivity). It is not a function of the length (which affects both). The temperature difference is simply the temperature gradient times the width of the vane.

Ignoring edge corrections for the purpose of developing a scaling relation, the thermal creep force is thus linearly proportional to the length and temperature difference of the vane, or $$F_{TC} \propto \Delta TL \quad (15)$$

Combining this result with relation (14) provides the following scaling relationship for the thermal creep force on a MEMS vane.

$$F_{TC} \propto \frac{W^2 L}{H} \quad (16)$$

In an investigation of a vane such as vane 504, 8 mm by 16 mm vanes generated a 9 K temperature difference. The temperature gradient had a characteristic length of 3.5 mm and thermal creep was observed at 30 Pa. Thus, the width of the vane at this pressure is 35 mean free paths and the length is 70 mean free paths. The width of the vane equals the characteristic length of the temperature gradient when the vane is 3.5 mm by 7 mm and the mean free path is 0.1 mm. Using these values in equation (2) provides a force of 173 nN. Scaling relationships (14) and (16) then predict a 6 mK temperature difference and a 0.08 pN force on a 2.4 μm by 4.8 μm device at atmospheric pressure. If instead a force of 1 pN was desired, relation (16) indicates the length could be increased to 60 μm or width increased to 8.5 μm. See Wolfe et al., *Physics of Fluids*, 28(3) (2016); see also U.S. patent application Ser. No. 15/093,047 by Larraza et al.

For a light activated generator such as that disclosed, a voltage produced is proportional to the angular velocity, magnetic field B, and the length of the vanes squared found by integrating the magnetic force, $\vec{v} \times \vec{B}$, over the length of a vane.

$$V = \frac{\omega B L^2}{2} \quad (4)$$

A radiometer with 100 μm vanes operating a 10 rad/s in a 1 T magnetic field could be expected to generate 50 nV. The small size though would allow numerous such devices to fit on a single chip able to generate larger voltages. The scaling relationships disclosed allow results from centimeter-scale vanes to be extended into the MEMS realm, and additionally indicate the effect of varying the aspect ratio of a light activated vanes.

In a particular embodiment, $\varepsilon_H$ is an emissivity of first surface 506 and $\varepsilon_C$ is an emissivity of second surface 508, and the width W of FIG. 3 is a dimension describing the portion of first surface 506 and second surface 508 adjacent to and perpendicular to common boundary 509, and an area $A_{exp}$ is equal to the larger of $A_{exp-1}$ of first surface 306 or $A_{exp-2}$ of second surface 508, and first section 505 and second section 507 are in thermal conductive communication through the area $A_{con}$ as before. Further, a length L is equal to $A_{exp}$ divided by W and a height H is equal to $A_{con}$ divided by W, and $k_t$ is as previously defined. In some embodiments, vane 504 has dimensions of L, H, and W and the property $k_t$ such that when vane 504 is surrounded by an atmosphere at the temperature $T_{env}$ such as 294 K, a $\Delta T_1$ is defined by eqn (12) and a $\Delta T_2$ is defined by eqn (13), and $\Delta T_1/\Delta T_2 \leq 1$. In another embodiment, $\Delta T_1/\Delta T_2 \leq 10$, and in a further embodiment $\Delta T_1/\Delta T_2 \leq 100$. It is understood that the property $k_t$ is impacted by material selections for first section 505, second section 507, and common boundary 509 when common boundary 509 comprises an intervening material or gap, and may additionally be impacted by a thermal contact resistances, which may be determined using means known in the art. See e.g. C. V. Madhusudana, *Thermal Contact Conductance* (1995), among others.

In a particular embodiment, a total width of first surface 506 and second surface 508 is less than 100 μm. In another embodiment, the emissivity $\varepsilon_H$ of first surface 506 is greater than or equal to 0.8 and the second emissivity $\epsilon_C$ of second surface 508 is less than 0.8. In some embodiments, $(\epsilon_H-\epsilon_C) \geq 0.1$. In other embodiments, the second emissivity $\epsilon_C$ of second surface 508 is less than 0.6. First section 505 and second section 507 may be comprised of any materials which meet the specifications disclosed herein. Additionally, first section 505 and second section 507 may comprise individual unitary pieces supporting or comprising first surface 506 and second surface 508 respectively, or may be portions of a single substrate supporting or comprising first surface 506 and second surface 508, or may be individual substrates each supporting either first surface 506 or second surface 508, or any other configuration generating a vane comprising a first surface and second surface as disclosed.

The disclosure provides a method for generating a voltage using a radiant flux comprising: (i) surrounding a vane with a gaseous atmosphere, where the vane is coupled to a hub and the hub surrounding an rotatable around an axle having a longitudinal axis, and where the vane comprises a conductor and further comprises a first surface and a second surface, where the first surface has a first emissivity and the second surface has a second emissivity where the second emissivity is less than the first emissivity, and where the second surface and the first surface have a common boundary where the second surface borders the first surface over a portion of the common boundary, and where the second surface is co-planer with the first surface over the portion of the common boundary, and where a reference plane is parallel to the second surface and the first surface over the portion of the common boundary and an acute angle between the longitudinal axis of the axle and a normal vector of the reference plane is less than 45 degrees; (ii) directing a radiant flux toward the first surface and the second surface of the vane; (iii) generating a first temperature on the first surface and a second temperature on the second surface using the radiant flux, where the first temperature is greater than the second temperature, thereby generating a temperature gradient across the vane; (iv) generating a thermal creep force from the first surface to the second surface using the temperature gradient and the gaseous atmosphere surrounding the vane; (v) generating rotary motion of the vane comprising the conductor and the hub around the axle using the thermal creep force; (vi) providing a magnetic field in a volume surrounding some portion of the rotary motion of the of the vane comprising the conductor; and (vi) generating the voltage between a first terminal in electrical contact with a first end of the conductor and a second terminal in electrical contact with a second end of the conductor, thereby generating the voltage using a radiant flux.

Thus, provided here is a light activated generator comprising one or more vanes coupled to a hub, where the hub is rotatable around an axle, and where the vane comprises a conductor, a first surface having a first emissivity and a second surface having a second emissivity, with the first emissivity greater than the second emissivity. The first surface and second surface of the vane are adjacent to and generally in contact with a common boundary where the common boundary is generally perpendicular to a longitudinal axis of the axle. When the first and second surfaces are impinged by a radiant flux, the radiant flux generates a temperature gradient across the vane resulting in a thermal creep force from the first surface to the second surface, producing revolution of the vane and conductor around the axle. As the conductor revolves around the axle, a perimeter contact establishes electrical contact with an end of the conductor. The light activated generator further comprises a field generator oriented to provide magnetic flux in a volume through which the conductor travels as electrical contact with the perimeter contact occurs, and a voltage generates between a first terminal in electrical contact with the conductor and a second terminal in electrical contact with the perimeter contact. In certain embodiments, a width W of the vane generally within the plane of rotation of the vane is at least 5 times greater than a height of the vane normal to the plane of rotation, in order to mitigate blunt drag forces as revolution occurs. In other embodiments, the width W is less than about 100 μm and the light activated rotor is surrounded by air at a pressure of at least 80 kPa.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

What is claimed is:

1. A light activated generator comprising:
    an axle having a longitudinal axis and fixably attached to a foundation;
    a hub surrounding the axle and the longitudinal axis and rotatable about the axle and the longitudinal axis;
    a vane coupled to the hub where the vane comprises:
        a first section, where the first section comprises first surface, and where the first surface has a first emissivity;
        a second section, where the second section comprises a second surface, and where the second surface has a second emissivity where the second emissivity is less than the first emissivity, where the second surface borders the first surface over a common boundary and where the second surface is co-planer with the first surface over a portion of the common boundary, where the portion of the common boundary is perpendicular to the longitudinal axis; and
        a conductor having a first end and a second end, where the first end is in electrical contact with a first terminal and where the second end traces a pitch circle around the axle when the hub rotates on the axle;
    a perimeter contact positioned on the pitch circle where the perimeter contact is positioned to be in electrical contact with the second end of the conductor over at least a portion of the pitch circle when the hub rotates on the axle;
    a field generator, where the field generator is positioned to provide a magnetic flux where the conductor passes through the magnetic flux provided when the perimeter contact is in electrical contact with the second end of the conductor;
    a second terminal in electrical contact with the perimeter contact.

2. The light activated generator of claim 1 where a reference plane is parallel with the second surface and the first surface over the portion of the common boundary and an acute angle between the longitudinal axis of the axle and a normal vector of the reference plane is less than 45 degrees.

3. The light activated generator of claim 2 where a line extending from the first end of the conductor to the second end of the conductor is perpendicular to the longitudinal axis of the axle.

4. The light activated generator of claim 3 where the vane has a height H perpendicular to the portion of the common boundary, and where a total width W is equal to a first surface width added to a second surface width, where the first surface width is a dimension of the first surface perpendicular to the portion of the common boundary and the second surface width is a dimension of the second surface perpendicular to the portion of the common boundary, and where the total width W is at least 5 times greater than the height H.

5. The light activated generator of claim 1 where the field generator is positioned to provide the magnetic flux perpendicular to the conductor when the perimeter contact is in electrical contact with the second end of the conductor.

6. The light activated generator of claim 1 where the field generator is configured to produce a magnetic field having a magnetic moment pointing from the south pole of the magnetic field to the north pole of the magnetic field, and the field generator is positioned such that the magnetic moment is perpendicular to the pitch circle traced by the second end of the conductor.

7. The light activated rotor of claim 6 where the field generator is positioned such that the magnetic moment is parallel to the longitudinal axis of the axle.

8. The light activated generator of claim 6 where the field generator is a permanent magnet providing the magnetic flux.

9. The light activated generator of claim 1 where the first emissivity minus the second emissivity is equal to at least 0.1.

10. The light activated generator of claim 1 further comprising:
   an atmosphere surrounding the vane;
   a radiant flux impinging the first surface and the second surface, and the radiant flux generating a first temperature on the first surface and a second temperature on the second surface, where the first temperature is greater than the second temperature, and the first temperature and the second temperature generating a temperature gradient and generating a thermal creep force in a direction from the first surface to the second surface and parallel to the first surface and the second surface over the portion of the common boundary, and the thermal creep force generating a revolution of the vane and the conductor around the longitudinal axis of the axle and the second end of the conductor tracing the pitch circle around the axle when the hub rotates on the axle; and
   the magnetic flux, and the magnetic flux and the conductor generating a voltage between the first terminal and the second terminal when the perimeter contact is in electrical contact with the second end of the conductor.

11. The light activated generator of claim 10 where the first emissivity minus the second emissivity is equal to at least 0.1.

12. The light activated generator of claim 11 where the atmosphere surrounding the vane comprises air at a pressure of at least 80 kPa, and where a total width W is equal to a first section width added to a second section width, where the first section width is a dimension of the first surface perpendicular to the portion of the common boundary and the second section width is a dimension of the second surface perpendicular to the portion of the common boundary, and where the total width is less than 100 microns.

13. A system for generating a voltage using a radiant flux:
   a light activated generator, where the light activated generator comprises:
      an axle having a longitudinal axis and fixably attached to a foundation;
      a hub surrounding the axle and the longitudinal axis and rotatable about the axle and the longitudinal axis;
      a vane coupled to the hub where the vane comprises:
         a first section, where the first section comprises first surface, and where the first surface has a first emissivity;
         a second section, where the second section comprises a second surface, and where the second surface has a second emissivity where the second emissivity is less than the first emissivity, where the second surface borders the first surface over a common boundary and where the second surface is co-planer with the first surface over a portion of the common boundary, where the portion of the common boundary is perpendicular to the longitudinal axis; and
      a conductor having a first end and a second end, where the first end is in electrical contact with a first terminal and where the second end traces a pitch circle around the axle when the hub rotates on the axle;
      a perimeter contact positioned on the pitch circle where the perimeter contact is positioned to be in electrical contact with the second end of the conductor over at least a portion of the pitch circle when the hub rotates on the axle;
      a second terminal in electrical contact with the perimeter contact;
   an atmosphere surrounding the light activated generator;
   the radiant flux impinging the first surface and the second surface, and the radiant flux generating a first temperature on the first surface and a second temperature on the second surface, where the first temperature is greater than the second temperature, and the first temperature and the second temperature generating a temperature gradient and generating a thermal creep force in a direction from the first surface to the second surface, and the thermal creep force generating a revolution of the vane and the conductor around the longitudinal axis of the axle; and
   a magnetic flux comprising lines of flux and the conductor cutting the lines of flux when the perimeter contact is in electrical contact with the second end of the conductor and the conductor generating the voltage between the first terminal and the second terminal, thereby generating the voltage using the radiant flux.

14. The system of claim 13 where the first surface has a first width where the first width is a dimension of the first surface perpendicular to the longitudinal axis of the axle, and where the second surface has a second width where the second width is a dimension of the second surface perpendicular to the longitudinal axis of the axle, and where the common boundary has a boundary width where the boundary width is perpendicular to the longitudinal axis of the axle, and where a total width W is equal to the first width added to the second width added to the boundary width, and where the total width W is greater than 5 times the mean free path of the atmosphere surrounding the light activated generator.

15. The system of claim 14 where the second section of the vane has a height where the height is a dimension of the second section perpendicular to the second width, and where the height of the second section is less than the total width W.

16. The system of claim 15 where the total width W is less than 100 microns and where the atmosphere surrounding the vane comprises air at a pressure of at least 80 kPa.

17. The system of claim 16 where the first emissivity minus the second emissivity is greater than or equal to 0.1.

18. A method of generating a voltage using a radiant flux comprising:

- surrounding a vane with a gaseous atmosphere, where the vane is coupled to a hub and the hub surrounds and is rotatable around an axle having a longitudinal axis, and where the vane comprises a first surface and a second surface, where the first surface has a first emissivity and the second surface has a second emissivity where the second emissivity is less than the first emissivity, and where the second surface and the first surface have a common boundary where the second surface borders the first surface over a portion of the common boundary, and where the second surface is co-planer with the first surface over the portion of the common boundary, and where the vane comprises a conductor having a first end and a second end, and where the first surface has a first width where the first width is a dimension of the first surface perpendicular to the longitudinal axis of the axle, and where the second surface has a second width where the second width is a dimension of the second surface perpendicular to the longitudinal axis of the axle, and where the common boundary has a boundary width where the boundary width is perpendicular to the longitudinal axis of the axle, and where a total width W is equal to the first width added to the second width added to the boundary width, and where the total width W is greater than 5 times the mean free path of the gaseous atmosphere surrounding the light activated generator;
- directing the radiant flux toward the first surface and the second surface of the vane;
- generating a first temperature on the first surface and a second temperature on the second surface using the radiant flux, where the first temperature is greater than the second temperature, thereby generating a temperature gradient across the vane;
- establishing a thermal creep force from the first surface to the second surface using the temperature gradient and the gaseous atmosphere surrounding the vane where the thermal creep force is parallel to the first surface and parallel to the second surface;
- generating rotary motion of the vane and the hub and the conductor comprising the vane around the axle using the thermal creep force;
- establishing a perimeter contact in electrical contact with the second end of the conductor;
- establishing a first terminal in electrical contact with the first end of the conductor and a second terminal in electrical contact with the perimeter contact;
- providing a magnetic flux and allowing the conductor to pass through the magnetic flux as the hub rotates around the axle and the perimeter contact is in electrical contact with the second end of the conductor; and
- generating a voltage between the first terminal and the second terminal.

* * * * *